United States Patent [19]

Shishkin et al.

[11] Patent Number: 4,936,707
[45] Date of Patent: Jun. 26, 1990

[54] METHOD OF LAYING A PIPELINE

[76] Inventors: Viktor V. Shishkin, ulitsa Festivalnaya, I6, kv.5; Nikolai F. Kryazhevskikh, ulitsa Krasnykh partizan, 559, kv.I3, both of Krasnodar; Viktor N. Oleinik, Leninsky prospekt, 8I, kv.I73, Moscow; Yaroslav P. Sushkov, ulitsa Kommunisticheskaya, 47/I, kv.73, Eisk, all of U.S.S.R.

[21] Appl. No.: 331,851

[22] Filed: Apr. 3, 1989

Related U.S. Application Data

[63] Continuation of Ser. No. 881,469, Jun. 9, 1986, abandoned.

[30] Foreign Application Priority Data

Oct. 17, 1984 [SU] U.S.S.R. ............................... 3797409
Oct. 17, 1984 [SU] U.S.S.R. ............................... 3797411

[51] Int. Cl.$^5$ ............................................... F16L 1/02
[52] U.S. Cl. ..................................... 405/154; 405/150; 285/55; 285/235; 285/293
[58] Field of Search ........................ 405/150, 154, 155; 285/55, 235, 293; 156/187, 287

[56] References Cited

U.S. PATENT DOCUMENTS

| | | | |
|---|---|---|---|
| 110,028 | 12/1870 | Germain | 285/293 |
| 662,618 | 11/1900 | Camp | 285/293 |
| 1,823,974 | 9/1931 | Ferguson | 285/293 |
| 3,230,722 | 6/1966 | Coulter et al. | 405/155 |
| 3,600,793 | 8/1971 | Masters | 29/430 |
| 3,865,526 | 2/1975 | Drostholm et al. | 156/187 X |
| 4,178,200 | 12/1979 | Hakert et al. | 156/187 |
| 4,233,101 | 11/1980 | Scragg et al. | 156/287 |
| 4,350,548 | 9/1982 | Zenbayashi et al. | 405/150 X |
| 4,372,796 | 2/1983 | Greuel | 156/187 |
| 4,437,789 | 3/1984 | Kasiewicz | 405/155 X |
| 4,456,401 | 6/1984 | Williams | 405/150 |
| 4,602,974 | 7/1986 | Wood et al. | 156/287 |

FOREIGN PATENT DOCUMENTS

| | | | |
|---|---|---|---|
| 44750 | 10/1935 | U.S.S.R. | |
| 648700 | 2/1979 | U.S.S.R. | 405/155 |
| 870839 | 10/1981 | U.S.S.R. | |
| 966382 | 10/1982 | U.S.S.R. | |
| 1024653 | 6/1983 | U.S.S.R. | |
| 1449455 | 9/1976 | United Kingdom | |
| 1370244 | 10/1979 | United Kingdom | 405/155 |

OTHER PUBLICATIONS

"Cleaning, Insulating and Laying Main Pipelines", NEDRA, Chapter IV, Moscow, 1973, pp. 115-118.
Polyansky et al, "Pipes for Oil and Gas Industry Abroad", NEDRA, Moscow, 1979, pp. 199-206.
"Pipeline Installation", May 5, 1979, pp. 17,18.

Primary Examiner—Randolph A. Reese
Assistant Examiner—John Ricci
Attorney, Agent, or Firm—Lilling & Greenspan

[57] ABSTRACT

The proposed pipeline is made up of pipe sections connected in succession by elastic outer coupling elements having their entire surface brought into intimate contact with pipe section joints. Provided at the ends of the pipe sections are recesses for accommodating coupling elements therein. The method for laying the above pipeline involves successive joining of its pipe sections by means of continuously placing several layers of a binder-impregnated tape onto the joints. The pipeline is lowered into a trench before the binder sets. The machine for carrying out the method includes a carriage with a frame on which there is mounted a mechanism for connecting, pressure-sealing, and insulating pipe sections of the pipeline. This mechanism is arranged at an angle to the path of travel of the carriage and capable of reciprocating and rotating relative to the pipe sections being joined into a pipeline.

5 Claims, 3 Drawing Sheets

METHOD OF LAYING A PIPELINE

This is a continuation of application Ser. No. 06/881,469 filed on June 9, 1986, now abandoned.

BACKGROUND OF THE INVENTION

1. Field of the Invention

This invention relates generally to civil engineering and more particularly to the construction of pipelines layed into ground trenches or placed on piers.

2. Description of the Prior Art

Wide application for pipeline transmission have found pipelines made up of pipe lengths or sections hermetically interconnected. Pipe sections are joined either by welding or by using flanged fittings. A pipeline made up of weld-joined pipe sections suffers from a disadvantage due to that welding damages pipe insulation resulting in subsequent corrosion and failure of the pipeline.

On the other hand, a pipeline made up of separate pipe sections joined by flanged fittings is prone to failure at high pressures, and is normally designed to operate at a pressure range of between 0.2 and 1.0 MPa. Therefore, operation of this pipeline is accompanied by a tendency of the pipe joints to leak.

Another major disadvantage of the pipeline so constructed is in that it is not amenable to automatic pipeline laying.

One procedure indispensable from constructing pipeline with outer insulation is the application of such outer insulation coating to pipe joints on the pipeline route site.

There is known a technique for applying coatings to outer pipeline surface by spraying. Special machines have been designed for this purpose capable of cleaning the pipeline surface, heating the pipe and applying insulation to pipe joints. A machine of this type has been initially field-tested in 1973 (cf., Poljansky R. P. and Pasternak V. I. "Truby dlja neftjanoi i gazovoi promyshlennosti az rubezhom", in Russian, the "Nedra" Publishers, Moscow, p. 201, 1979).

For applying coatings to the inner surface of pipelines by spraying "in-situ", a range of machines have been developed. Such coating application operations involve, for example, injecting epoxide compounds to the interior of the pipe from both ends thereof (cf., the above publication, pp. 201 and 202).

There are known tape- or belt-type coatings used both for insulating the length of pipe and pipe joints, as well as for repairing outer insulation applied to the pipeline longitudinal seam (cf., U.S. Pat. No. 3,600,793, published Aug. 24, 1971).

Inherent in the aforedescribed constructions and techniques is a disadvantage due to low efficiency of pipeline laying and insufficient reliability of pressure-sealing more particularly, flanged fitting and gasket-type pipe joining fails to withstand skewing and water hammer effects during pipeline operation, whereas joining the pipe sections by welding requires a high degree of accuracy.

There is also known a pipeline laying method including the steps of digging a trench, joining separate pipe sections together by welding, applying an outer insulation, and lowering the pipeline into the trench.

However, this method suffers from a disadvantage because no insulation is applied to the inner surface of the pipeline resulting in reduced reliability and shorter service life of the pipeline. Another disadvantage is that the pipeline laying procedure is not automated.

There is further known a method of pipeline laying wherein a trench is dug and the pipe sections are joined by means of a binder and couplings, after which the trench is backfilled with soil (cf., USSR Inventor's Certificate No. 870,839, published 1979).

A disadvantage of the above method is that the pipeline laying operation is not amenable to automation. In addition, the joints between pipe sections fail to withstand high pressure.

There is widely known an apparatus for connecting steel pipes into a pipeline, such as a pipe welding machine.

However, this machine is likewise disadvantageous because it cannot be used for connecting pipes fabricated from such different materials as reinforced concrete, steel, ceramics, and the like. Also, the pipeline laying operation is not automatic.

SUMMARY OF THE INVENTION

The invention is directed toward the provision of a pipeline construction which would ensure sufficiently high strength characteristics to withstand the high pressure of product being transmitted therethrough, would be amenable to automatic laying and would be sufficiently durable and reliable.

These and other objects and attending advantages are attained in a pipeline made up of separate pipe sections connected in succession therebetween by outer coupling elements. According to the invention, the coupling elements are elastic to and their entire surface contract joints of the pipe sections, recesses to accommodate the coupling elements being provided at the pipe section ends.

This pipeline can be made up of pipe sections fabricated from a range of various materials, and can be layed automatically.

The aforedescribed features improve the reliability and increase the life of the pipeline, especially pipe joints.

The pipe joints of the pipeline constructed according to the invention can withstand a pressure which is as high as one exerted on the pipe section walls.

The recesses at the pipe section ends and the provision of outer and inner pipewall insulation results in increased reliability and durability of the pipeline.

The provision of the coupling element in the form of a reel tape, impregnated with a binder occupying the recesses of the pipe sections being joined, makes it possible to automate the pipe laying operation and simplify the coupling elements structurally.

Additional coupling elements provided along the entire inner surface of the pipeline and fabrication of these elements from a material capable of withstanding axial and radial loads makes it possible to increase the throughput flow capacity of the pipeline, as well as improve its reliability and extend its service life.

Fashioning the additional coupling elements as an elastic hose simplifies and automates their installation.

These objects are also attained by a method for laying the heretofore described pipeline including the steps of successively joining the pipe sections, pressure-sealing these sections, insulating the pipeline, and laying it into a trench. According to the invention, the pipe sections are joined by continuously applying several layers of a binder-impregnated tape, the pipeline being lowered into the trench before the binder sets.

This make it possible to easily automate the pipeline laying procedure and make pipelaying more efficient.

The method also ensures that all the operations are carried out simultaneously, which makes the pipelaying operation less time-consuming.

The binder-impregnated tape is wound in a joint-to-joint succession along a helical line, which facilitates automation of the pipeline laying operation.

In order to automate the pipeline laying operation, it is preferable that the procedures for joining the pipe sections, their pressure-sealing and laying the pipeline be carried out simultaneously, the pipe sections being joined and pressure-sealed above the trench with each successive pipe section to be connected to the finished portion of the pipeline.

The fabrication of the elastic hose from a tape and introduction of the hose by means of a working agent forced into a pipe cavity formed by crimped ends of the hose facilitates simultaneous joining, pressure-sealing and laying pipe sections to speed up the pipeline construction.

The attachment of the hose by a binder introduced to the interior of the pipeline ahead of the elastic hose makes the pipeline more reliable in operation and durable.

Heating the walls of the pipeline to secure the elastic hose on the inner surface of the pipeline prior to applying insulation to its outer surface simplifies the pipeline laying procedure and minimizes the amount of binder required.

Yet another object of the invention is attained by a machine for laying the pipeline which comprises a self-propelled carriage having a frame mounted thereon, and a means for laying the pipeline into a trench. According to the invention, the frame carries a mechanism for joining, pressure-sealing and insulating the pipe sections arranged at an angle to the path of travel of the carriage and capable of reciprocating and rotating about the pipe sections being connected into the pipeline.

The above arrangement of the machine makes it possible to simultaneously connect separate pipe sections, pressure-seal joints between the pipe sections, lay the pipeline into the trench, and apply outer and inner insulation to the pipeline.

By virtue of the fact that the mechanism for joining the pipe sections comprises a reel of tape and means for impregnating the tape with a binder, the pipeline can be made up of pipes fabricated from different materials.

The arrangement in the pipeline of the elastic hose, one end of which is turned inside out and attached to the inner wall of the pipe and to form a cavity communicable with the system for feeding a working agent, as well as the provision ahead of the hose of a piston having a means for adjusting the amount of force required for moving the piston lengthwise of the pipeline, ensures high quality and reliability of the proposed pipeline.

The application of outer and inner insulation to the pipeline is facilitated by the heating elements engaging with the outer surface of the pipeline.

The provision of a feedback system connected to the system for feeding the working agent to the pipeline and to the heating elements ensures uniform quality of insulation and prevents insulation burn-throughs.

BRIEF DESCRIPTION OF THE DRAWINGS

The invention will now be described in greater detail with reference to a specific embodiment thereof taken in conjunction with the accompanying drawings, in which.

DETAILED DESCRIPTION OF THE INVENTION

Figure 1:
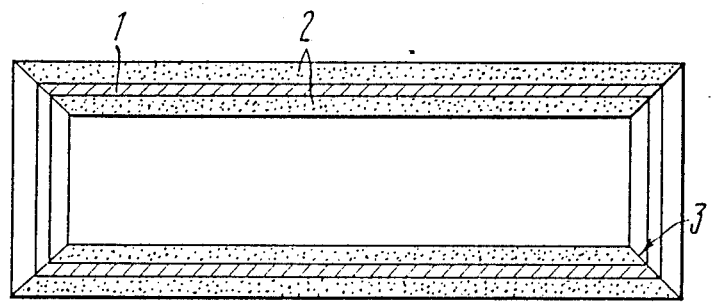
FIG. 1 is a view of a reinforced concrete pipe section having inner recesses.
Figure 2:
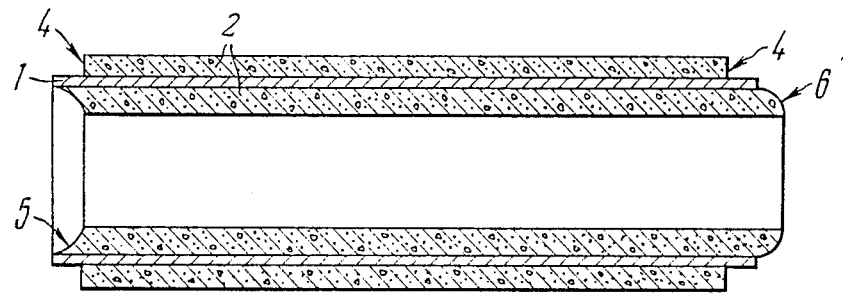
FIG. 2 shows a reinforced concrete pipe section having outer recesses.

With reference to FIGS. 1 and 2, the pipe according to the invention comprises a steel core 1 coated on the inside and outside with an insulation 2. For joining the pipes together the pipe ends may be provided, for example, with inner tapers 3, (FIG. 1) or shoulders 4, (FIG. 2) made at the outer surface of the pipes. To facilitate joining, a spherical recess 5 is provided at one end of the pipe, while the other end has a spherical chamfer 6.

Figure 3:
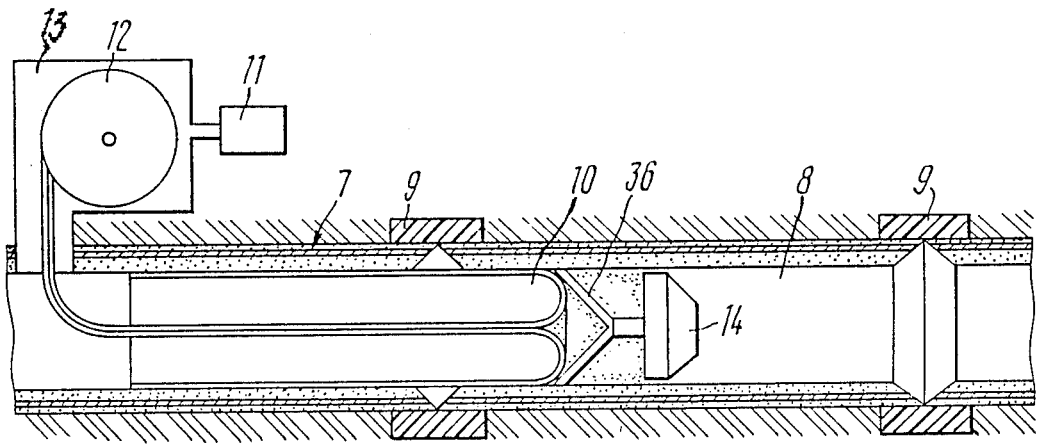
FIG. 3 is a sectional view of a pipeline into which an elastic hose and a piston are introduced.

Referring now to FIG. 3, a pipeline 7 is made up of separate pipe sections 8. The pipe sections 8 are hereinafter understood to mean pipe lengths fabricated from different materials suitable for the purpose.

The pipe sections 8 are joined together by couplings 9 fabricated from an elastic material, such as glass fiber impregnated with a binder; these coupling elements 9 are brought into intimate contact with the connection portions of the pipe sections 8, the joint elements being received by the shoulders 4 (FIG. 2) at the ends of the pipe sections 8.

The pipe sections 8 are also connected on the inside by joint elements fabricated from an elastic tap and fashioned as a hose 10 which takes up axial and radial loads.

The inner recesses 3 of the pipe sections 8 are covered with a binder, such as any of known suitable adhesive or gum, this binder serving to bond the pipe sections 8, joint elements 9 and hose 10.

During pipeline operation the joint elements take up axial and radial forces and make the pipeline reliably pressure-tight. The pipeline joints are capable of withstanding the same pressure as that exerted on the walls of the pipe sections 8. The pipeline is flexible enough to bend with the soil when the latter is moved, whereby pipeline ruptures are obviated.

The pipeline is layed in the following manner.

The pipe lengths are interconnected in succession by continuously applying several layers of a binder-impregnated tape onto the joint, the pipe sections 8 being coupled immediately above the trench, whereafter the pipeline is lowered into the trench before the binder sets to form a bond.

Subsequent to laying the pipe sections 8 in the trench the pipeline 7 conforms lengthwise the configuration of the trench to obviate bending moments. After which the binder sets at the joints between the pipe lengths.

Preferably, the tape is wound onto the surface of the pipe sections 8 in a joint-to-joint succession continuously.

After the tape has been wound on the joint, the thus connected pipe section 8 is lowered into the trench, whereas a successive pipe section 8 is connected to the pipeline 7 above the trench.

In the course of laying the pipeline 7 an elastic hose 10 is introduced into the pipeline 7, the end of this hose 10 being turned inside out to be secured to the inner surface of the pipeline 7. The hose 10 is introduced into the interior of the pipeline 7 by forcing compressed air, such as from a compressor 11, to a cavity formed by the crimped edges of the hose 10. The hose 10 is reeled off a drum 12 accommodated in a pressure-sealed chamber communicating with the pipeline 7.

In order that the hose 10 be adhered to the inner surface of the pipe sections 8, a piston 14 is first inserted into the pipeline 7, whereas any known suitable adhesive is pumped into a space between the hose 10 and piston 14. This piston 14 provides a force required for its travel along the pipeline 7, thus calling for a certain pressure to be produced inside the hose 10, this pressure normally amounting to a pressure under which the pipeline is tested for strength. This pressure makes the binder act on the coupling 9 causing it to break away at weak points for the thus formed gaps between the coupling 9 and the outer surface of the pipeline 7 to be filled with the binder, after which the binder tends to polymerize and form a bond between the coupling 9, pipeline 7 and elastic hose 10.

Such a procedure completely obviates leaks in the joints between the pipe sections 8.

Alternatively, instead of glueing the hose 10 to the inner surface of the pipeline 7, it can be welded to the pipeline.

For this purpose the wall of the pipeline 7 is heated prior to the application of the outer coating. The pipeline 7 is normally heated by any known suitable annular furnace mounted onto the pipeline before the machine for applying the insulation coating. This annular furnace is moved simultaneously with the coating application machine along the outer surface of the pipeline 7.

Concurrently, the hose 10 fabricated from a polymer material is being introduced into the pipeline 7. The inner surface of the pipeline 7 is heated by the above furnace to a temperature sufficient for melting the hose 10, which subsequent to cooling of the pipeline is reliably welded to the inner wall of the pipeline 7.

Figure 4:
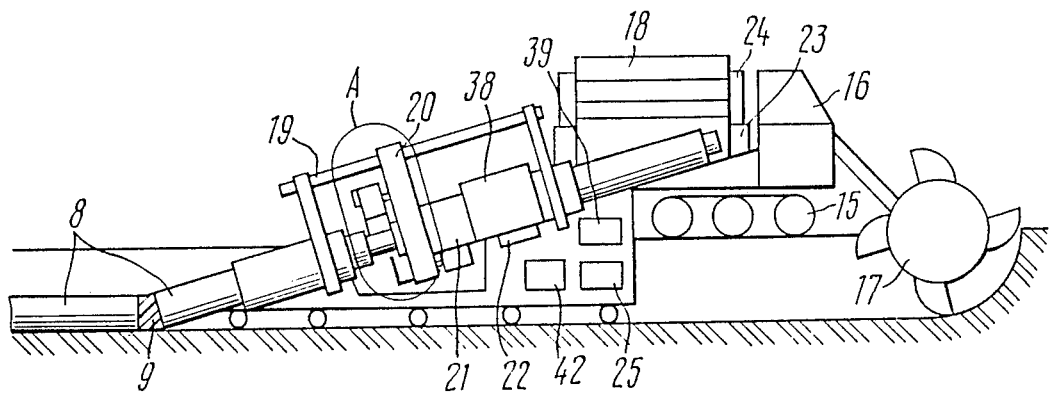
FIG. 4 is a side view illustration of a machine for laying a pipeline according to the invention.
Figure 5:
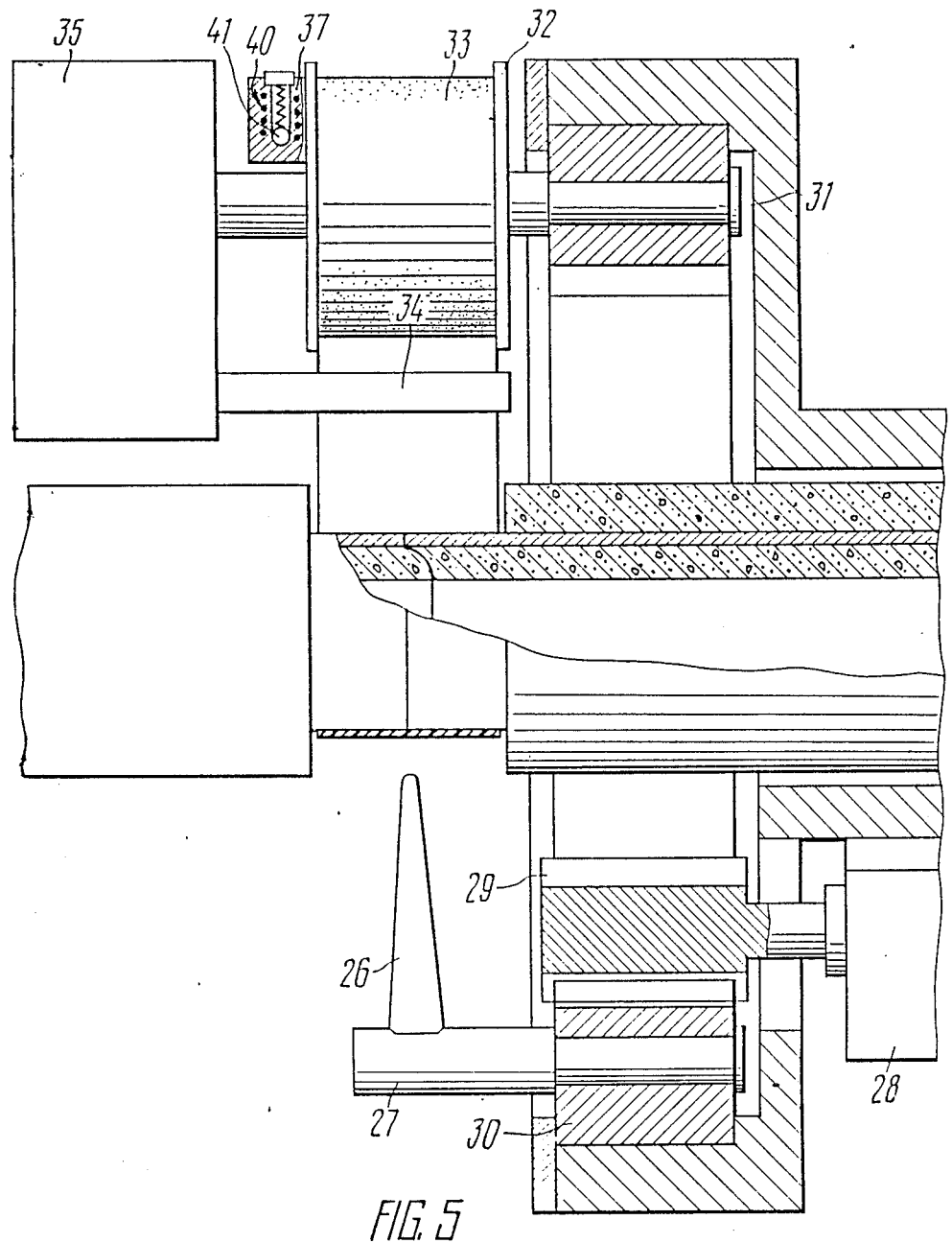
FIG. 5 is an enlarged view partly in section of section A in FIG. 4.

With reference to FIGS. 3 and 4, the machine for laying the pipeline comprises a carriage 15 with a frame rigidly connected to a trench digging machine 16 having a rotor 17 and a charging hopper 18. Secured on the frame in guides 19 is a mechanism 20 for connecting, pressure-sealing and applying an insulation coating to the separate pipe sections 8 of the pipeline provided with a holder tube 21 secured to the carriage 15 and connected to hydraulic power cylinders 22. The mechanism 20 is at an angle to the path of travel of the frame and is capable of reciprocating relative to the carriage 15. A feeding means 23 with hydraulic power cylinders 24 is arranged before the charging hopper 18. The hydraulic power cylinders 22 and 24 are controlled by a hydraulic distributor 25 by means of contacts 26 (FIG. 5) secured on a lever 27. An electric motor 28 rotates a gear 29 which transmits rotation to a wheel 30 carrying levers 27 and 31. Attached to the lever 31 is a reel 32 with a tape 33 impregnated with a binder delivered through a conduit 34 from a tank 35. The holder tube 21 has a length greater than the length of the pipe section 8. Secured on the inner surface of the pipeline 7 joined by the tape 33 is the end of the elastic hose turned inside out, whereby a cavity thus formed is communicated with the system for feeding a working agent by the compressor 11. Arranged ahead of the hose 10 inside the pipeline 7 is the piston 14 provided with a braking means 36. The braking means 36 is made up of flat springs to function as a means for adjusting the force required for moving the piston 14 inside the pipeline 7.

The space between the hose 10 and piston 14 is filled with the binder.

The system for feeding the working agent, particularly the compressor 11, is connected through a feedback system 37 with an annular furnace 38 wired to a power source 39.

The feedback system 37 is fashioned, for example, as a centrifugal potentiometer 40 having a spring-loaded magnet 41 secured on the reel 32.

Through a transmitter 42 the signal produced by the potentiometer 40 is delivered to the system for feeding the working agent, particularly the compressor 11.

During the forward travel of the trench digging machine 16 in the direction of pipe laying the rotor digs a trench, while the carriage 15 rigidly connected to the machine moves along the bottom of the thus made trench. The separate pipe sections 8 are delivered from the charging hopper 18 to the inclined plane of the carriage 15 to be fed to the holder tube 21. The electric motor 28 rotates the gear 29, whereby the wheel 30 rotates about the joint between the pipe sections 8 for the tape 33 impregnated with the binder to be wound thereon. At this point in operation the finished pipe joint is lowered to the trench, whereas the trench digging machines continues its forward travel. The mechanism 20 with the pipe joint is also lowered along the guides 19 under the action of the pistons of the hydraulic power cylinders 22 and 24. This movement takes place at an angle to the path of travel of the carriage 15. As soon as the required number of tape coils is wound onto the joint, the tape 33 engages the contacts 26 of the hydraulic distributor 25, which reverses the movement of the pistons of the hydraulic power cylinders 22 and 24 to return them at a higher speed together with the mechanism 20 rotating around the pipe back into the initial position, whereby the tape 33 is wound onto the portion of the pipe section 8 along a helical line. At this point in operation a successive pipe section 8 is fed from the hopper 18 to the holder tube 21. When the contacts 26 of the hydraulic distributor 25 reach the joint between the pipe sections 8, they tend to break, and the pistons of the hydraulic power cylinders again move simultaneously with the movement of the successive pipe section 8. Thereafter, the cycle is repeated.

The pipe sections 8 are linked together on the inside by the hose 10. With this aim in view, the system 11 for feeding the working agent produces an overpressure in the cavity formed by the crimped surface of the hose 10. Under the action of the overpressure the hose 10 is caused to move forward lengthwise inside the pipeline 7 to be placed either on a binder covering the inside surface of the pipeline 7, or bonded thereto by a thermoplastic method. The piston 14, while being moved in the interior of the pipeline by the hose 10, functions as a means for controlling the pressure of binder occupying the space between the piston 14 and hose 10. The annular furnace 38 secured in the holder tube 21 ensures that the hose 10 is bonded to the inside surface of the pipeline 7 by a thermoplastic method through heating the pipeline wall prior to the application of an outer insulation thereto. As the tape 33 of outer insulation is being reeled off, the rotation of the drum 32 is accompanied by the rotation of the centrifugal potentiometer 40. The rotational speed of the centrifugal potentiometer is monitored by the magnet 41 to respond to the rate of laying the pipe sections 8 in the trench. The potentiometers 40 and magnet 41 ensure control over the temperature to which the the walls of the pipe sections are heated. In case the trench digging machine 16 stops, the feedback system 37 acts to deactuate the system for feeding the working agent, viz., compressor 11.

For laying pipelines from pipe sections having inner tapers 3 (FIG. 1) at their ends the pipe sections are joined on the inside by a binder which fills gaps between the pipe sections, the elastic hose 10 being pressed to the pipeline walls due to the overpressure of the working agent until the binder is set to form a bond and reliably pressure-seal the joint.

The present invention is most advantageous for use during laying main pipelines from pipe sections fabricated from such widely varying materials as steel, wrought-iron, asbestos and ceramics. Such pipelines can find application for transmitting a range of liquid and gaseous products.

We claim:

1. A method for laying a pipeline, comprising the steps of successively connecting separate pipe sections by wrapping the joints between the pipe sections around with an adhesive-impregnated tape, lowering each successive section being joined to the pipeline already laid into the trench at an angle until solidification of the adhesive impregnating the wrapping tape, introducing a hose turnable inside out from one end forming the beginning of the pipeline, placing a piston with a brake ahead of the hose, introducing adhesive between the hose and the piston, displacing the hose in step with the addition of new sections of the pipeline and pressure-testing and sealing the joints between the pipes.

2. A method as claimed in claim 1, wherein the tape is transferred to the next joint between the sections by wrapping it around a pipe section helically at a larger pitch.

3. A method as claimed in claim 1, wherein compressed air is pumped under the maximum pressure for the given pipeline into the out-turned portion of the hose as the hose is moved in step within the pipeline, and the pressure to the adhesive is transmitted by mechanically retaining the piston in front of the hose with a force maintaining said maximum pressure.

4. A method as claimed in claim 1, further comprising the step of attaching the elastic hose to the inner surface of the pipeline with the help of the adhesive which is displaced along the pipeline ahead of the elastic hose.

5. A method as claimed in claim 1, further comprising the step of turning the hose out into the interior of the pipeline in step with the addition of new pipe sections, moving the adhesive that does not react with the surface of the elastic hose and returning the hose to the starting position after the adhesive has been expended and polymerized.

* * * * *